US010116541B2

(12) United States Patent
Nistor et al.

(10) Patent No.: US 10,116,541 B2
(45) Date of Patent: Oct. 30, 2018

(54) TCP CONNECTIONS RESILIENCY SYSTEM FOR TESTING NETWORKS IN UNSTABLE ENVIRONMENTS

(71) Applicant: Ixia, Calabasas, CA (US)

(72) Inventors: Marius Pavel Nistor, Bucharest (RO); Mihail Florin Constantinescu, Bucharest (RO)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 255 days.

(21) Appl. No.: 15/046,419

(22) Filed: Feb. 17, 2016

(65) Prior Publication Data
US 2017/0237638 A1   Aug. 17, 2017

(30) Foreign Application Priority Data
Feb. 15, 2016   (RO) .............................. A 2016 00116

(51) Int. Cl.
*H04L 12/26*   (2006.01)
*H04L 29/06*   (2006.01)
*H04L 29/08*   (2006.01)

(52) U.S. Cl.
CPC .......... *H04L 43/0847* (2013.01); *H04L 67/42* (2013.01); *H04L 69/16* (2013.01); *H04L 69/329* (2013.01)

(58) Field of Classification Search
CPC ..... H04L 43/0847; H04L 67/42; H04L 69/16; H04L 43/0823; H04L 43/0829
See application file for complete search history.

(56) References Cited

U.S. PATENT DOCUMENTS

| 7,222,255 | B1 * | 5/2007 | Claessens | ........... H04L 12/2697 709/224 |
| 8,418,000 | B1 * | 4/2013 | Salame | ................. G06F 11/079 714/26 |
| 2007/0121516 | A1 * | 5/2007 | Hannel | ................... H04L 29/06 370/241 |

(Continued)

OTHER PUBLICATIONS

"Improve application performance with network assessment and diagnostics," IxChariot Server and Desktop Editions, IXIA data sheet, p. 1-12 (publication date unknown).

(Continued)

*Primary Examiner* — Joe Chacko

(57) ABSTRACT

The subject matter described herein relates to methods, systems, and computer readable media for test system connection resiliency. In some examples, a method for testing a network device under test (DUT) includes exchanging a sequence of data packages over a transmission control protocol (TCP) connection between a client and a server and through the network DUT. The method includes storing client sequence identifiers and server sequence identifiers. The method includes synchronizing, in response to detecting an error on the TCP connection, the client and the server to a last data package exchanged prior to the error using the client sequence identifiers and the server sequence identifiers and resuming a test script at a next data package after the last data package exchanged prior to the error in the sequence of data packages.

19 Claims, 6 Drawing Sheets

(56) References Cited

U.S. PATENT DOCUMENTS

| | | | | |
|---|---|---|---|---|
| 2008/0010523 A1* | 1/2008 | Mukherjee | .......... | G06F 11/3414 714/25 |
| 2009/0182868 A1* | 7/2009 | McFate | ................ | G06F 9/5027 709/224 |
| 2009/0262743 A1* | 10/2009 | Uyehara | ................ | H04L 43/08 370/394 |
| 2012/0176920 A1* | 7/2012 | Fuchs | .................... | H04L 43/50 370/252 |
| 2013/0196600 A1* | 8/2013 | Capers | ................ | H04W 24/06 455/41.2 |

OTHER PUBLICATIONS

Comer, "Chapter 13: Reliable Stream Transport Service (TCP)," Internetworking With TCP/IP vol. 1: Principles, Protocols, and Architecture, Third Edition, Department of Computer Sciences, Purdue University, p. 191-229 (1995).

* cited by examiner

TCP CONNECTIONS RESILIENCY SYSTEM FOR TESTING NETWORKS IN UNSTABLE ENVIRONMENTS

PRIORITY CLAIM

This application claims the benefit of Romanian Patent Application No. a 2016 00116, filed Feb. 15, 2016; the disclosure of which is incorporated herein by reference in its entirety.

TECHNICAL FIELD

The subject matter described herein relates generally to communications test systems. More particularly, the subject matter described herein relates to methods, systems, and computer readable media for test system connection resiliency.

BACKGROUND

Network test systems can measure and test various aspects of data communications networks such as network performance and service status. Network test systems can be used to detect and resolve network issues, improving network performance and user experience. Some network test systems operate by executing test scripts to transmit data over a data communications network at one endpoint and receive the data at another endpoint. The received data can be compared to the transmitted data to determine some aspects of network performance, such as whether a particular network device is operating according to performance specifications of the network device.

In some network test systems, when a network connection fails during execution of a test script, the test script ends with a network communication error. This can be undesirable for testing certain devices, for example, where a network device producer expects a network device to drop connections when executing performance tests and wants the test to continue despite the dropped connections to observe longer-term performance. In those cases, the test script must be re-executed from the beginning. In light of these difficulties, there exists a need for methods, systems, and computer readable media for test system connection resiliency.

SUMMARY

The subject matter described herein relates to methods, systems, and computer readable media for test system connection resiliency. In some examples, a method for testing a network device under test (DUT) includes exchanging a sequence of data packages over a transmission control protocol (TCP) connection between a client and a server and through the network DUT. The method includes storing client sequence identifiers and server sequence identifiers. The method includes synchronizing, in response to detecting an error on the TCP connection, the client and the server to a last data package exchanged prior to the error using the client sequence identifiers and the server sequence identifiers and resuming a test script at a next data package after the last data package exchanged prior to the error in the sequence of data packages.

The subject matter described in this specification may be implemented in hardware, software, firmware, or combinations of hardware, software and/or firmware. In some examples, the subject matter described in this specification may be implemented using a non-transitory computer readable medium storing computer executable instructions that when executed by one or more processors of a computer cause the computer to perform operations. Computer readable media suitable for implementing the subject matter described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described in this specification may be located on a single device or computing platform or may be distributed across multiple devices or computing platforms.

DETAILED DESCRIPTION

Figure 1:
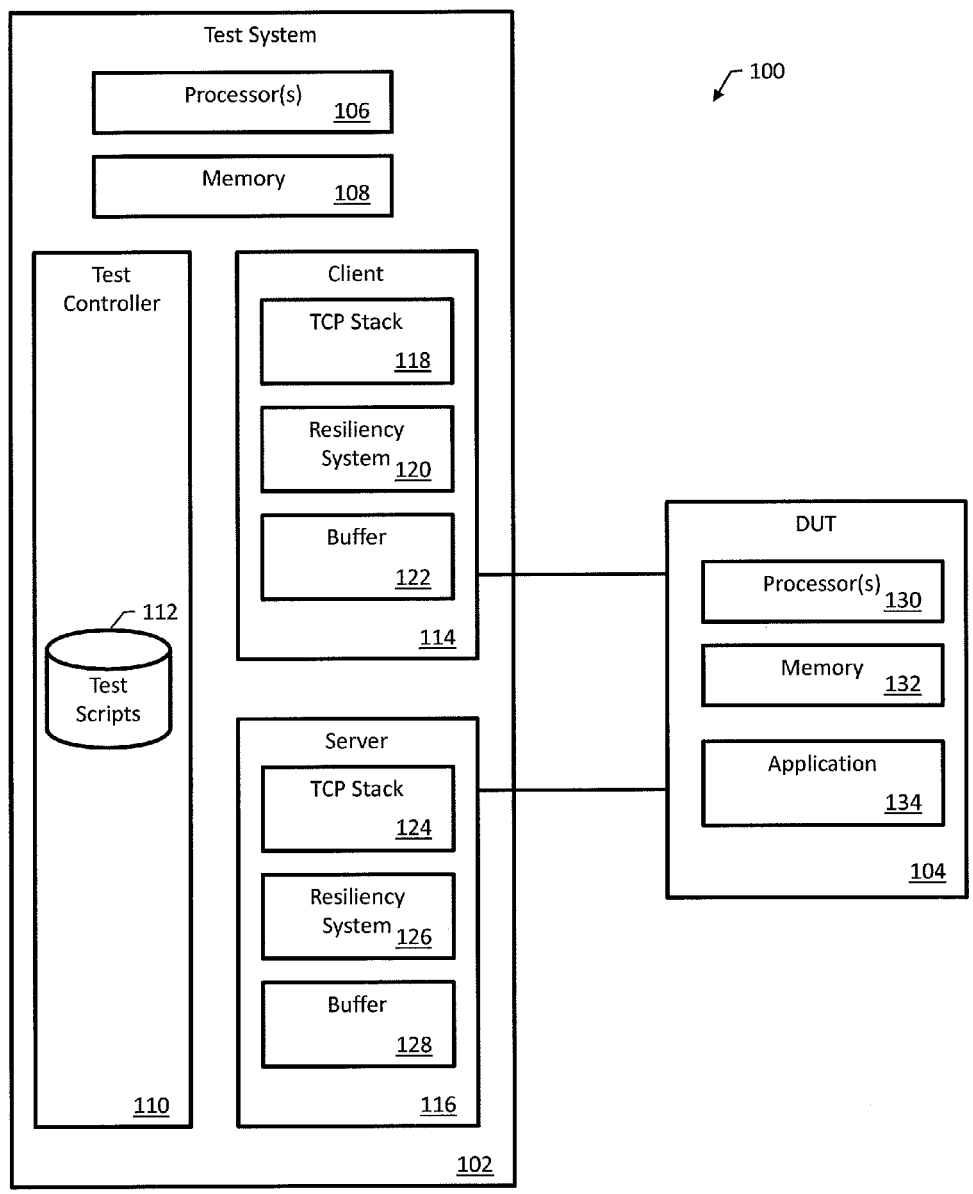
FIG. 1 is a block diagram of an example communications environment including a network equipment test device configured to test a network device under test (DUT)

FIG. 1 is a block diagram of an example communications environment 100 including a network equipment test device 102 configured to test a network device under test (DUT) 104. Network equipment test device 102 may be one or more physical devices that send test data packages to DUT 104 and that monitors the response of DUT 104.

Network equipment test device 102 includes one or more processors 106 and memory 108. Memory 108 can store executable instructions for processors 106 that, when executed by processors 106, causes processors 106 to perform operations for testing DUT 104. The instructions can include software that is loaded into random access memory (RAM) and executed by processors 106.

Network equipment test device 102 includes a test controller 110, implemented using processors 106 and memory 108, for executing one or more test scripts selected from a repository of test scripts 112. A test script specifies a sequence of data packages to be exchanged over a data communications network. A data package can be, e.g., an Internet protocol (IP) packet or a related number of IP packets or other packets. A test script can specify various other data for implementing a test, for example, failure conditions that test controller 110 can use to determine whether a given test is successful.

Network equipment test device 102 includes a client 114 and a server 116 that are implemented using processors 106 and memory 108. Client 114 and server 116 can be implemented as, for example, two separate software processes executing on a same computer system, or as two separate hardware units under control of the test controller 110 by separate data connections. Test controller 110 uses client 114 and server 116 to exchange sequences of data packages by way of a data communications network connection through network DUT 104.

Client 114 includes a transmission control protocol (TCP) stack 118, a client resiliency system 120, and a buffer 122. TCP stack 118 is configured to establish a TCP connection with server 116 and to exchange TCP messages with server 116. Client resiliency system 120 is configured to implement test system connection resiliency by storing client sequence identifiers. Buffer 122 is configured to store sent and received messages and client sequence identifiers for the sent and received messages.

Server 116 includes a TCP stack 124, a server resiliency system 126, and a buffer 128. TCP stack 124 is configured to establish a TCP connection with client 114 and to exchange TCP messages with client 114. Server resiliency system 126 is configured to implement test system connection resiliency by storing server sequence identifiers. Buffer 128 is configured to store sent and received messages and client sequence identifiers for the sent and received messages.

Network DUT 104 can include one or more processors 130 and memory 132. Memory 132 can store executable instructions for processors 130 that, when executed by processors 130, causes processors 130 to perform operations for executing an application 134. The instructions can include software that is loaded into random access memory (RAM) and executed by processors 130.

Network DUT 104 is configured to receive, process, and send data packages. Network DUT 104 can be, for example, a wireless router, a firewall, or a network address translation (NAT) device. Network DUT 104 can include specialized hardware for performing network operations, e.g., under control of application 134. Network DUT 104 reaches various device states depending on the messages being processed by network DUT 104.

For example, network DUT 104 may store a certain number of network addresses in a network address table or be under a certain load with respect to a specified load of network DUT 104.

In operation, test controller 110 executes a test script to test network DUT 104 by exchanging a sequence of data packages over a TCP connection between client 114 and server 116. The test script is configured, e.g., by virtue of a system administrator or network device designer selecting appropriate messages in the script, so that exchanging the sequence of data packages causes network DUT 104 to reach various device states. Test controller 110 monitors the response of DUT 104 at various devices states to determine whether the test is successful.

While client 114 and server 116 are exchanging the sequence of data packages, client resiliency system 120 stores client sequence identifiers referred to as send sequence numbers (SSNs) for each data package sent by client 114 and receive sequence numbers (RSNs) for each data package received by client 114. Client resiliency system 120 increments the SSNs and the RSNs so that each sent data package has a unique client SSN and each received data package has a unique client RSN. The SSNs and RSNs can be application layer numbers distinct from TCP sequence numbers.

Similarly, server resiliency system 126 stores server sequence identifiers including SSNs for each data package sent by server 116 and RSNs for each data package received by server 116. Server resiliency system 126 increments the SSNs and the RSNs so that each sent data package has a unique server SSN and each received data package has a unique server RSN. In general, the client and server resiliency systems 120 and 126 will initialize the first SSN of client 114 and the first RSN of server 116 to a same initial value, e.g., 0 or 1, and the first RSN of client 114 and the first SSN of server 116 to the same initial value. Typically, storing sequence identifiers does not include exchanging sequence identifiers over the TCP connection and does not include altering payloads of the data packages.

While executing a test script, network equipment test device 102 may detect an error on the TCP connection, e.g., by receiving an error message from network DUT 104. For example, DUT 104 may fail to operate as specified due to a load on network DUT 104 exceeding a specified load. Client 114 or server 116 or both may detect the error on the TCP connection.

In response to detecting the error on the TCP connection, client resiliency system 120 and server resiliency system 126 synchronize client 114 and server 116 to a last data package exchanged prior to the error using the client sequence identifiers and the server sequence identifiers. Test controller 110 resumes executing the currently executing test script at a next data package after the last data package sent prior to the error in the sequence of data packages.

For example, synchronizing client 114 and server 116 can include exchanging at least a first RSN from client 114 to server 116 and a second RSN from server 116 to client 114. Each of the client 114 and server 116 sends the RSN for the last successfully received data package. Server 116 uses the first RSN and at least a first SSN to determine the last data package exchanged prior to the error, e.g., where the first SSN is the server SSN corresponding to the first RSN from client 114. Client 114 uses the second RSN at least a second SSN to determine the last data package exchanged prior to the error, e.g., where the second SSN is the client SSN corresponding to the second RSN from server 116.

In this manner, client 114 and server 116 exchange any data packages that were dropped as a result of the error. Moreover, synchronizing client 114 and server 116 may not perturb network DUT 104 from the particular device state that network DUT 104 was in at the time of the error. So test controller 110 can resume the test script without having to start over from the beginning, and test controller 110 can test network DUT 104 under the conditions that brought about the error.

In some examples, client resiliency system 120 and server resiliency system 126 correlate client 114 and server 116 to identify which test script was executing at the time of the error so that that test script can be resumed at the next data package. Correlating client 114 and server 116 can include sending a correlation identifier that identifiers the executing test script. For example, correlating client 114 and server 116 can include determining that a destination port of the TCP connection is shared between multiple connections and, in response, exchanging a correlator identifier from client 114 to server 116 to identify the executing test script. Correlator identifiers can be stored with test scripts in the test script repository 112 and supplied to client 114 and server 116 as appropriate.

In operation, client and server resiliency systems 120 and 126 can recover TCP connections on the fly while maintaining the test state on both client 114 and server 116. Client and server resiliency systems 120 and 126 need not alter payloads of test traffic, and no additional time is needed to re-setup a test and reproduce issues that produce errors, which can be difficult or not possible in some cases by simply re-running the test. Client and server resiliency systems 120 and 126 can maintain environmental conditions while recovering TCP connections and allow for monitoring network DUT 104 behavior in failure conditions, and client and server resiliency systems 120 and 126 can provide functionality for ignoring transient network failures and still determining accurate test results for longer duration performance tests.

Figure 2:
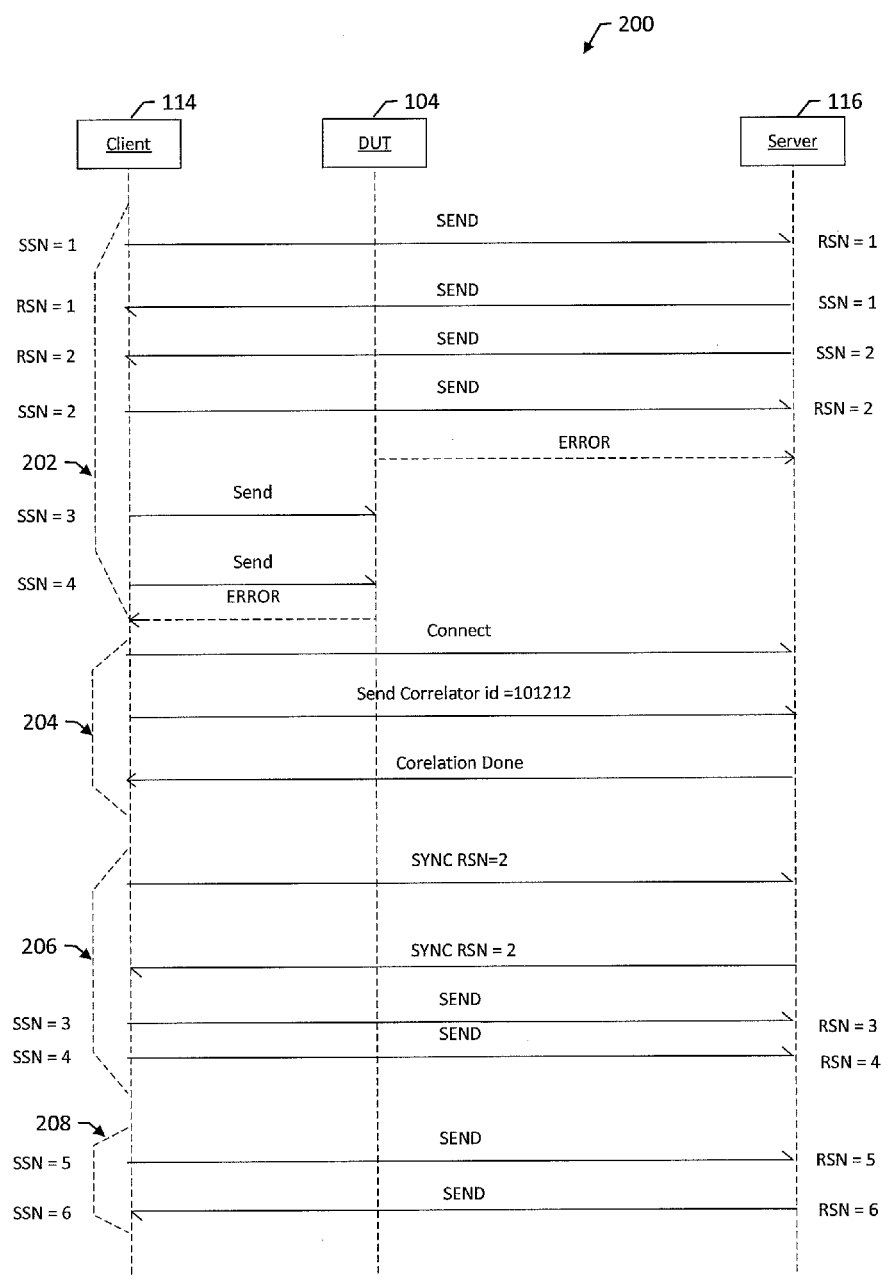
FIG. 2 is a message flow diagram of an example exchange of messages that illustrates test system connection resiliency.

FIG. 2 is a message flow diagram 200 of an example exchange of messages that illustrates test system connection resiliency. In this example exchange, client 114 and server 116 have established a TCP connection by way of a data communications network connection through network DUT 104 and are executing a test script.

In a first exchange of messages 202, client 114 first sends a message to server 116. Client 114 stores a SSN of 1 for that message and server 116 stores a RSN of 1 for that message. Server 116 then sends a message to client 114. Client 114 stores a RSN of 1 for that message and server 116 stores a SSN of 1 for that message. Server 116 sends another message, and client 114 stores a RSN of 2 for that message and server 116 stores a SSN of 2 for that message. Then client 114 sends another message, and client 114 stores a SSN of 2 for that message and server 116 stores a RSN of 2 for that message.

Then network DUT 104 sends an error message to server 116. Client 114 has not yet received an error message and continues with the test script. Client 114 sends a first message and records a SSN of 3 for the message, but server 116 does not receive the message since network DUT 104 is an error state. Client 114 sends another message and records a SSN of 4 for that message, but server 116 also does not receive that message. Network DUT 104 then sends an error message to client 114.

In response to detecting the error, client 114 and server 116 begin synchronization to determine the last message send prior to the error and correlation to ensure that client 114 and server 116 are on the same test script. In a second exchange of messages 204 for correlation, client 114 sends a TCP connect message followed by a message with a correlator identifier. Server 116 responds with a correlation done message.

In a third exchange of messages 206 for synchronization, client 114 sends a synchronization RSN of 2 to server 116. Client 114 sends the RSN of 2 because 2 is the highest RSN it stored prior to the error. Server 116 sends a synchronization RSN of 2 to client 114. Server 116 sends the RSN of 2 because 2 is the highest RSN it stored prior to the error.

Client 114 then determines that the message it sent with a SSN of 2 was the last message it sent prior to the error and so re-sends the message with a SSN of 3. Server 116 receives the message and resumes storing sequence identifiers by storing a RSN of 3 for the message. Server 116 stores an RSN of 3 by incrementing the synchronization RSN that it send to client 114. Client 114 then also re-sends the message with a SSN of 4, and server 116 stores a RSN of 4 for that message. At this point, synchronization is complete.

In a fourth exchange of messages 208, client 114 and server 116 resume the test script as if the error had not happened. Client 114 sends a message and records a SSN of 5 for the message, and server 116 receives the message and records a RSN of 5 for the message. Client 114 sends another message and records a SSN of 5 for the message, and server 116 receives the message and records a RSN of 6 for the message.

Figure 3:
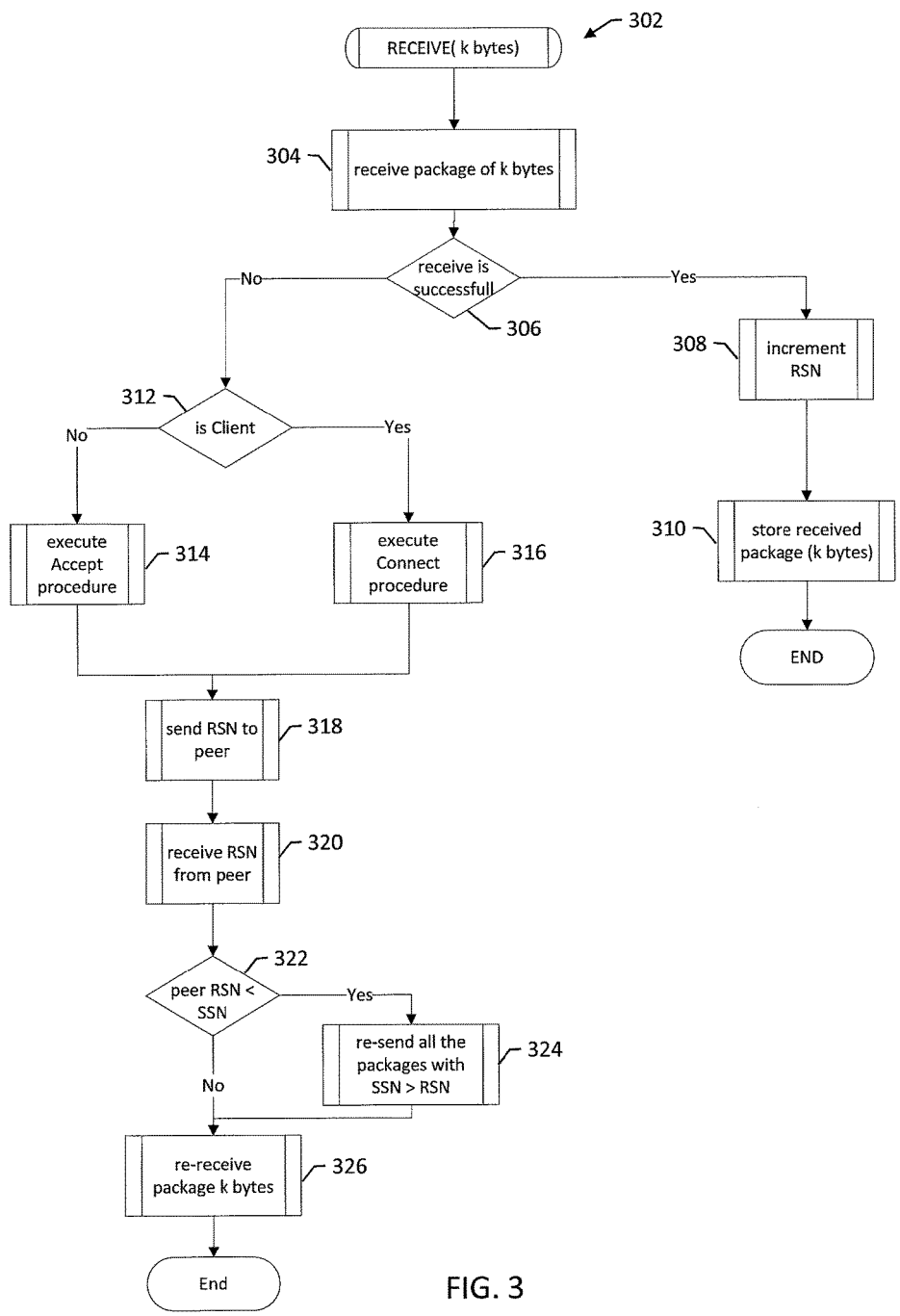
FIG. 3 is a flow chart of an example method for receiving data packages using the resiliency system.

FIG. 3 is a flow chart of an example method 302 for receiving data packages using the resiliency system. Method 302 is performed by either client 114 or server 116. For purposes of illustration, method 302 will be described with respect to a system that performs method 302 with a peer. If the system is client 114, then the peer is server 116; if the system is server 116, then the peer is client 114.

The system executes a TCP receive action to receive k bytes (304). If the receive is successful (306), the system increments a current RSN (308). The system stores the received package associated with the incremented RSN (310).

If the receive is not successful (306), then the system executes the TCP accept procedure (314) if the system is the server (312) and the system executes the TCP connect procedure (316) if the system is the client (312). Then the system sends a SYNC message to the peer with the RSN of the last package it received (318) and the system receives a SYNC message from the peer with the RSN of the last package the peer received (320).

The system compares the RSN received from the peer with the last SSN of the packages from the system's list of sent packages (322). The system re-sends the packages from the system's list of sent packages having a SSN greater than the RSN received from the peer (324). The system the re-receives the package of k bytes (326). In this manner, the system determines which packages were not received by the peer and sends those packages again, so that the system is in sync with the peer at the end of the synchronization phase.

Figure 4:
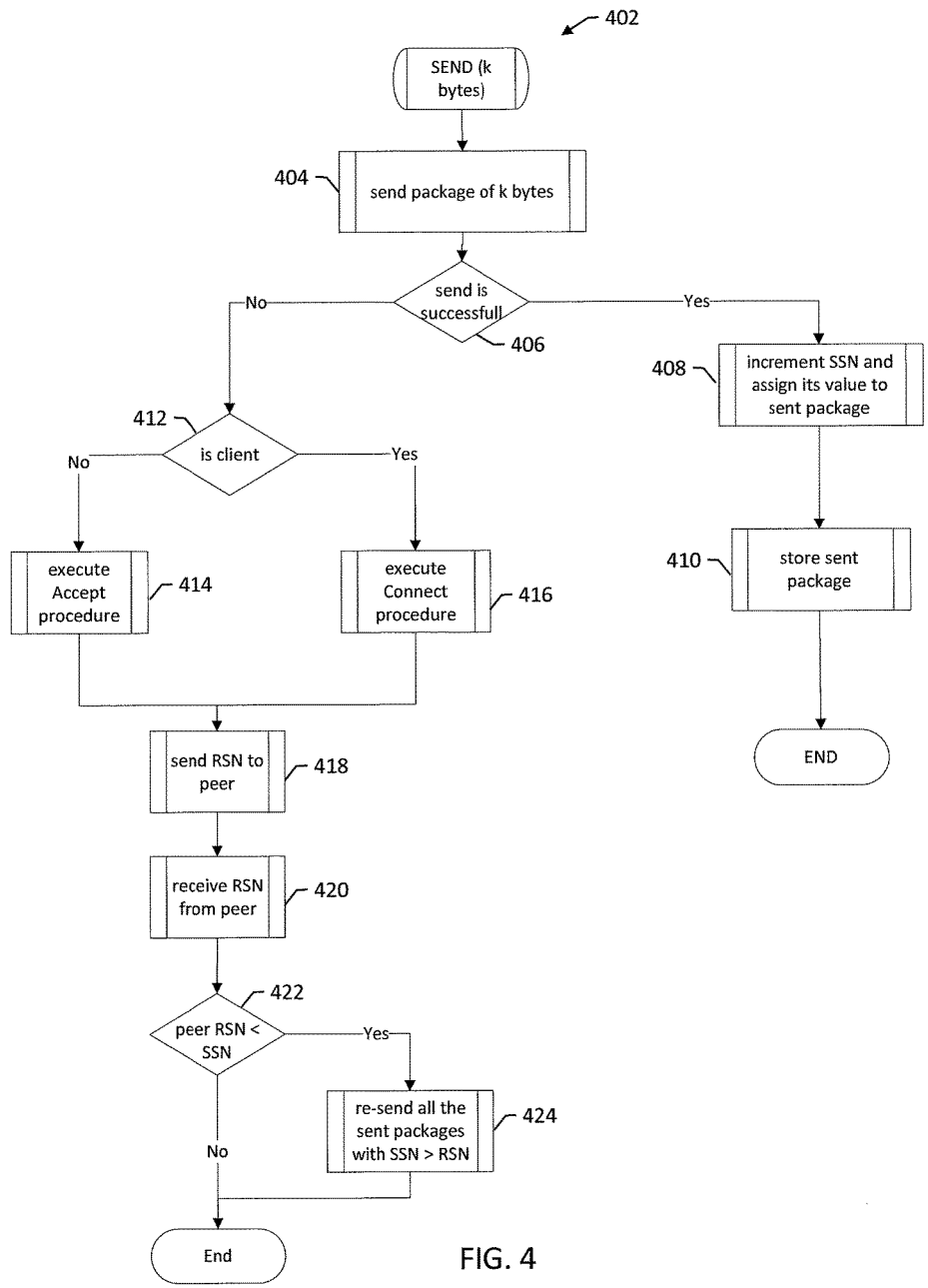
FIG. 4 is a flow chart of an example method for sending data packages using the resiliency system.

FIG. 4 is a flow chart of an example method 402 for sending data packages using the resiliency system. Method 402 is performed by either client 114 or server 116. For purposes of illustration, method 402 will be described with respect to a system that performs method 402 with a peer. If the system is client 114, then the peer is server 116; if the system is server 116, then the peer is client 114.

The system executes a TCP send action to send k bytes (404). If the send is successful (406), the system increments a current SSN (408). The system stores the sent package associated with the incremented SSN (410).

If the send is not successful (406), then the system executes the TCP ACCEPT procedure (414) if the system is the server (412) and the system executes the TCP CONNECT procedure (416) if the system is the client (412). Then the system sends a SYNC message to the peer with the RSN of the last package it received (418) and the system receives a SYNC message from the peer with the RSN of the last package the peer received (420).

The system compares the RSN received from the peer with the last SSN of the packages from the system's list of sent packages (422). The system re-sends the packages from the system's list of sent packages having a SSN greater than the RSN received from the peer (424). In this manner, the system determines which packages were not received by the peer and sends those packages again, so that the system is in sync with the peer at the end of the synchronization phase.

Figure 5:
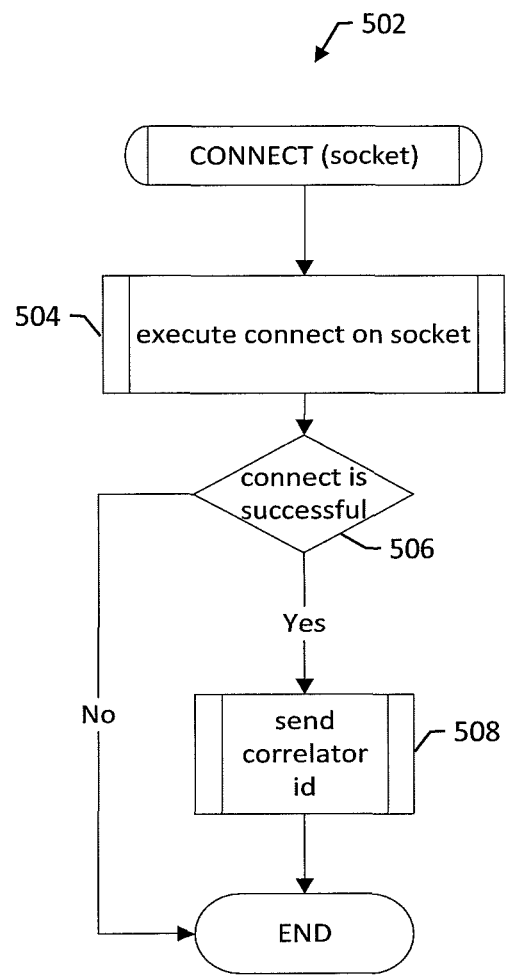
FIG. 5 is a flow chart of an example method for initiating a connection using the resiliency system.

FIG. 5 is a flow chart of an example method 502 for initiating a connection using the resiliency system. Method 502 is performed by client 114. Client 114 executes the TCP connect operation on the socket (504). If the connection is successful (506), client 114 sends a correlator identifier to server 116 so that server 116 can correctly identify the test script to be executed (508). If the connection is not successful (506), the connect operation may be repeated until it is successful or another appropriate end condition is reached, e.g., after a specified number of attempts is reached.

Figure 6:
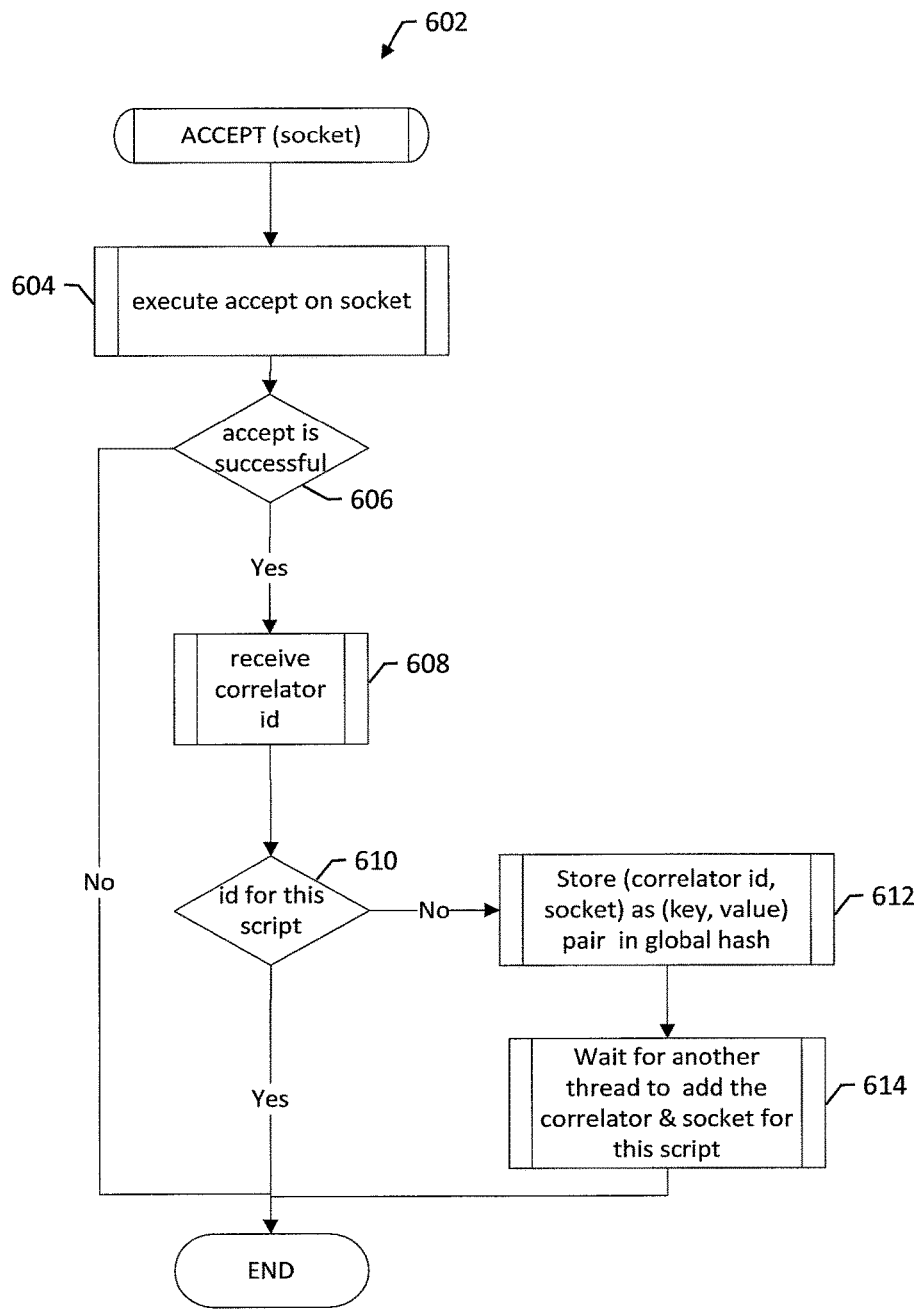
FIG. 6 is a flow chart of an example method for accepting a connection using the resiliency system.

FIG. 6 is a flow chart of an example method 602 for accepting a connection using the resiliency system. Method 602 is performed by server 116. Server 116 executes the TCP accept operation on the socket (604). If the connection is successful (606), server 116 receives a correlator identifier for use in identifying the test script to be executed (608). Server 116 may not need the correlator identifier in situations where the script can be identified using other information, e.g., the destination port, but in situations where the destination port is shared among multiple connections, server 116 can use the correlator identifier.

If the correlator identifier corresponds to the currently executing script (610), e.g., the script currently running on a particular thread for server 116, then server 116 can simply resume that script. Otherwise, server 116 adds the (correlator identifier, socket) pair in a global hash (612), Server 116 waits for another thread to add the correlator identifier and socket for the currently executing script (614). In this manner, server 116 may avoid affecting higher level software layers or application logic while recovering from an error.

Accordingly, while the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for testing a network device under test (DUT), the system comprising:
   a network equipment test device including at least one processor;
   a client and a server implemented by the network equipment test device and configured to establish a transmission control protocol (TCP) connection between the client and the server and through the network DUT, wherein the client and the server are implemented on one or more processors;
   a test controller implemented by the network equipment test device and configured to execute a test script to test the network DUT by exchanging a sequence of data packages over the TCP connection between the client and the server; and
   a resiliency system including a client side portion and a server side portion implemented by the network equipment test device and configured to store, for each data package exchanged between the client and the server over the TCP connection, a client sequence identifier for the data package and a server sequence identifier for the data package, and, in response to detecting an error on the TCP connection, synchronizing the client and the server to a last data package exchanged prior to the error using the client sequence identifiers and the server sequence identifiers and resuming the test script at a next data package after the last data package exchanged prior to the error in the sequence of data packages;
   wherein the resiliency system is configured to store a unique receive sequence number (RSN) for each of a plurality of received data packages and a unique send sequence number (SSN) for each of a plurality of sent data packages, and wherein synchronizing the client and the server comprises exchanging at least a first RSN from the client to the server and a second RSN from the server to the client.

2. The system of claim 1, wherein the resiliency system is configured to store a first send sequence number (SSN) for a first sent data package and a second SSN for a second sent data package sent after the first sent data package and to determine the second SSN by incrementing the first SSN.

3. The system of claim 2, wherein the resiliency system is configured to store a first receive sequence number (RSN) for a first received data package and a second RSN for a second received data package received after the first received data package and to determine the second RSN by incrementing the first RSN.

4. The system of claim 3, wherein the operations comprise initializing the first SSN of the client and the first RSN of the server to a same initial value and initializing the first RSN of the client and the first SSN of the server to the same initial value.

5. The system of claim 1, wherein the first RSN indicates a last data package received by the client and the second RSN indicates a last data package received by the server, and wherein the server is configured to use the first RSN and at least a first SSN to determine the last data package exchanged prior to the error, and wherein the client is configured to use the second RSN and at least a second SSN to determine the last data package exchanged prior to the error.

6. The system of claim 1, wherein the test script is configured so that exchanging the sequence of data packages causes the network DUT to reach a particular device state prior to or at a same time as the error on the TCP connection, and wherein synchronizing the client and the server to the last data package exchanged prior to the error does not perturb the network DUT from the particular device state before resuming the test script at the next data package.

7. The system of claim 1, wherein the client sequence identifier and the server sequence identifier comprise application layer sequence numbers distinct from TCP sequence numbers.

8. The system of claim 1, wherein the resiliency system is configured to correlate, in response to detecting the error on the TCP connection, the client and the server to identify the test script for resuming the test script at the next data package.

9. The system of claim 8, wherein correlating the client and the server comprises determining that a destination port of the TCP connection is shared between a plurality of connections and exchanging a correlator identifier from the client to the server to identify the test script.

10. A method for testing a network device under test (DUT), the method comprising:
    executing a test script to test the network DUT by exchanging a sequence of data packages over a transmission control protocol (TCP) connection between a client and a server and through the network DUT, wherein the client and the server are implemented on one or more processors;

storing, for each data package exchanged between the client and the server over the TCP connection, a client sequence identifier for the data package and a server sequence identifier for the data package, including storing a unique receive sequence number (RSN) for each of a plurality of received data packages and a unique send sequence number (SSN) for each of a plurality of sent data packages; and in response to detecting an error on the TCP connection, synchronizing the client and the server to a last data package exchanged prior to the error using the client sequence identifiers and the server sequence identifiers and resuming the test script at a next data package after the last data package exchanged prior to the error in the sequence of data packages, wherein synchronizing the client and the server comprises exchanging at least a first RSN from the client to the server and a second RSN from the server to the client.

11. The method of claim 10, comprising storing a first send sequence number (SSN) for a first sent data package and a second SSN for a second sent data package sent after the first sent data package and to determine the second SSN by incrementing the first SSN.

12. The method of claim 11, comprising storing a first receive sequence number (RSN) for a first received data package and a second RSN for a second received data package received after the first received data package and to determine the second RSN by incrementing the first RSN.

13. The method of claim 12, comprising initializing the first SSN of the client and the first RSN of the server to a same initial value and initializing the first RSN of the client and the first SSN of the server to the same initial value.

14. The method of claim 10, wherein the first RSN indicates a last data package received by the client and the second RSN indicates a last data package received by the server, and wherein the server is configured to use the first RSN and at least a first SSN to determine the last data package exchanged prior to the error, and wherein the client is configured to use the second RSN and at least a second SSN to determine the last data package exchanged prior to the error.

15. The method of claim 10, wherein the test script is configured so that exchanging the sequence of data packages causes the network DUT to reach a particular device state prior to or at a same time as the error on the TCP connection, and wherein synchronizing the client and the server to the last data package exchanged prior to the error does not perturb the network DUT from the particular device state before resuming the test script at the next data package.

16. The method of claim 10, wherein the client sequence identifier and the server sequence identifier comprise application layer sequence numbers distinct from TCP sequence numbers.

17. The method of claim 10, comprising correlating, in response to detecting the error on the TCP connection, the client and the server to identify the test script for resuming the test script at the next data package.

18. The method of claim 17, wherein correlating the client and the server comprises determining that a destination port of the TCP connection is shared between a plurality of connections and exchanging a correlator identifier from the client to the server to identify the test script.

19. One or more non-transitory computer readable mediums storing instructions for one or more processors that, when executed by the one or more processors, cause the one or more processors to perform operations comprising:

executing a test script to test a network device under test (DUT) by exchanging a sequence of data packages over a transmission control protocol (TCP) connection between a client and a server and through the network DUT, wherein the client and the server are implemented on one or more processors;

storing, for each data package exchanged between the client and the server over the TCP connection, a client sequence identifier for the data package and a server sequence identifier for the data package, including storing a unique receive sequence number (RSN) for each of a plurality of received data packages and a unique send sequence number (SSN) for each of a plurality of sent data packages; and in response to detecting an error on the TCP connection, synchronizing the client and the server to a last data package exchanged prior to the error using the client sequence identifiers and the server sequence identifiers and resuming the test script at a next data package after the last data package exchanged prior to the error in the sequence of data packages, wherein synchronizing the client and the server comprises exchanging at least a first RSN from the client to the server and a second RSN from the server to the client.

* * * * *